United States Patent
Hawtof et al.

(10) Patent No.: US 6,672,106 B1
(45) Date of Patent: Jan. 6, 2004

(54) METHOD AND APPARATUS FOR FORMING SOOT FOR THE MANUFACTURE OF GLASS

(75) Inventors: Daniel W. Hawtof, Painted Post, NY (US); John Stone, III, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/762,307

(22) PCT Filed: Jul. 22, 1999

(86) PCT No.: PCT/US99/16616

§ 371 (c)(1),
(2), (4) Date: Jan. 31, 2001

(87) PCT Pub. No.: WO00/07949

PCT Pub. Date: Feb. 17, 2000

Related U.S. Application Data (60) Provisional application No. 60/095,736, filed on Aug. 7, 1998.

(51) Int. Cl.[7] .......................... C03B 20/00; C03B 19/12
(52) U.S. Cl. .......................... 65/17.2; 65/17.4; 65/414; 65/421
(58) Field of Search .................. 65/17.2, 17.4, 65/414, 421; 423/336, 337

(56) References Cited

U.S. PATENT DOCUMENTS

| | | | |
|---|---|---|---|
| 4,336,049 A | * | 6/1982 | Takahashi et al. ............ 65/390 |
| 4,443,239 A | * | 4/1984 | Biswas et al. ................ 65/395 |
| 5,043,002 A | | 8/1991 | Dobbins et al. .............. 65/386 |
| 5,108,665 A | | 4/1992 | Crooker et al. ................ 264/6 |
| 5,110,335 A | | 5/1992 | Miller et al. .................. 65/425 |
| 5,622,750 A | | 4/1997 | Kilian et al. ............. 427/163.2 |
| 5,788,730 A | | 8/1998 | Ruppert et al. .............. 65/17.4 |
| 5,979,185 A | * | 11/1999 | Blackwell et al. ........... 65/17.4 |
| 6,079,225 A | * | 6/2000 | Ruppert et al. .............. 65/17.2 |
| 6,260,385 B1 | * | 7/2001 | Sempolinski et al. ........ 65/17.4 |

FOREIGN PATENT DOCUMENTS

| | | |
|---|---|---|
| JP | 55-23067 | 2/1980 |
| JP | 56-14438 | 2/1981 |

* cited by examiner

*Primary Examiner*—Sean Vincent
(74) *Attorney, Agent, or Firm*—Timothy R. Krogh; Kevin M. Able (57) ABSTRACT

The present invention is directed to a method and apparatus for forming soot used in making glass, and in particular, optical waveguides. A liquid precursor (66) is first fed into orifice (52) of a liquid orifice insert (48) within an injector (44) positioned within an atomizing burner assembly, and is thereafter discharged from the injector into a pressurization chamber (56). An atomization gas (70) is also fed into the pressurization chamber (56) to mix with the liquid precursor liquid stream (68) which breaks into droplets (76). The liquid precursor and atomization gas arm forced under pressure out of an atomization orifice (32) on the face of the burner (30) assembly. Flame gas (74), reaction gas (84) and shield gas (82) are ejected from burner orifices (40, 38, 36 and 34) to produce the flame. The atomized liquid precursor thus discharged is fed into the flame (72) produced at the face of the burner assembly where the atomized liquid precursor reacts with the flame to form soot (78) on a rotating mandrel (80).

21 Claims, 7 Drawing Sheets

METHOD AND APPARATUS FOR FORMING SOOT FOR THE MANUFACTURE OF GLASS

This application claims the benefit of provisional application 60/095,736 filed Aug. 7, 1998.

FIELD OF THE INVENTION

The present invention relates to the formation of soot used in the manufacture of glass and, more particularly, to a method and apparatus for the delivery of liquid precursors to a flame during flame hydrolysis.

While the invention is subject to a wide range of glass soot deposition applications, it is especially suited for making soot for use in the manufacture of optical waveguides, and will be particularly described in that connection.

BACKGROUND OF THE INVENTION

Various processes are known in the art that involve the production of metal oxides from vaporous reactants. Such processes require a feedstock solution or precursor, a means of generating and transporting vapors of the feedstock solution (hereafter called vaporous reactants) and an oxidant to a conversion reaction site (also known as a soot reaction zone to those skilled in the art), and a means of catalyzing oxidation and combustion coincidentally to produce finely divided, spherical aggregates, called soot. This soot can be collected on any deposition receptor in any number of ways ranging from a collection chamber to a rotating mandrel. The collected soot may be simultaneously or subsequently heat treated to form a non-porous, transparent, high purity glass article. This process is usually carried out with specialized equipment having a unique arrangement of nozzles and burners.

Much of the initial research that led to the development of such processes focused on the production of bulk silica. Selection of the appropriate feedstock was an important aspect of that work. Consequently, it was at that time determined that a material capable of generating a vapor pressure of between 200–300 millimeters of mercury (mm Hg) at temperatures below approximately 100° C. would be useful for making such bulk silica. The high vapor pressure of silicon tetrachloride ($SiCl_4$) suggested its usefulness as a convenient vapor source for soot generation and launched the discovery and use of a series of similar chloride-based feedstocks. This factor, more than any other is responsible for the presently accepted use of $SiCl_4$, $GeCl_4$, $POCl_3$, and $BCl_3$ as feedstock vapor sources.

Use of these and other halide-based feedstocks as vapor sources, however, does have its drawbacks. The predominate drawback being the formation of hydrochloric acid (HCl) as a by-product of oxidation. HCl is not only detrimental to the deposition substrates and the reaction equipment, but to the environment as well. Overcoming this drawback, amongst others, led to the use of halide-free compounds as precursors or feedstocks for the production of soot for optical waveguides.

Although use of halide-free silicon compounds as feedstocks for fused silica glass production, as described in U.S. Pat. Nos. 5,043,002 and 5,152,819, avoids the formation of HCl, other problems remain, particularly when the glass is intended for the formation of optical waveguides and high purity silica soot. It has been found that, in the course of delivering a vaporized polyalkylsiloxane feedstock to the burner, high molecular weight species can be deposited as gels in the line carrying the vaporous reactants to the burner, or within the burner itself. This leads to a reduction in the deposition rate of the soot that is subsequently consolidated to a blank from which an optical waveguide fiber is drawn. It also leads to imperfections in the blank that often produce defective and/or unusable optical waveguide fiber from the affected portions of the blank. An additional problem encountered while forming silica soot using siloxane feedstocks is the deposition of particulates having high molecular weights and high boiling points on the optical waveguide fiber blank. The build-up of these particulates results in "defect" or "clustered defect" imperfections that adversely affect the optical and structural quality of optical waveguides formed using the silica soot.

Defects typically are in the form of small (i.e. 0.1 to 4.0 mm in diameter) bubbles in a glass body. They are often formed in fused silica by an impurity, such as uncombusted gelled polyalkylsiloxane. A very small particle of siloxane gel can be the initiation site for such a defect. Since siloxane decomposes at high temperature after being deposited on the glass body; it can give off gases that cause the formation of the defect. Clustered defects are larger glass defects found in optical waveguide fiber preforms, and often occur as a series of defects in the form of a line or a funnel-or flower-shaped cluster. Typically, a large particle of gel is the initiation site for a clustered defect. After the gel particle has struck the porous preform, it causes a raised area to stand out on the preform surface. Because the clustered defect is a raised site, more heat transfer passes to this site. Due to this increased heat transfer, more thermophoresis occurs at the site, causing the imperfection to grow and leave behind a string of defects. As a result of the clustered defect, the affected portion of the optical waveguide preform cannot be consolidated normally, and the consequent irregularity in the blank yields a defective optical waveguide. For example, in the case of a typical 100 kilometer consolidated waveguide fiber blank, which has a diameter of 70 millimeters (mm) and a length of 0.8 meter (m), the presence of one clustered defect on the surface of the blank will typically result in the loss of 5 kilometers of optical waveguide fiber during drawing. In the case of a larger consolidated blank, the negative impact of a single clustered defect is proportionately higher. In a 250 kilometer consolidated blank, which has a diameter of 90 mm and a length of 1.8 m, one clustered defect on the surface of the blank will typically result in the loss of 8 kilometers of optical waveguide fiber during drawing.

U.S. patent application Ser. No. 08/767,653, discloses that clustered defects can be reduced by delivering a liquid siloxane feedstock to a conversion site, atomizing the feedstock at the conversion site, and converting the atomized feedstock at the conversion site into silica. Because the precursors are delivered directly into a burner flame as a liquid rather than a vapor, the vapor pressure of the precursors is no longer a limiting factor in the formation of soot for optical waveguides. However, the external atomizers and their methods of use disclosed in application Ser. No. 08/767,653 are not without limitation. External atomizers typically have a liquid discharge orifice that is co-planer or substantially co-planar with the burner face. Accordingly, the liquid and the atomizing gases come together at the surface of the burner. Since the flame is generated adjacent the face of the burner, atomization must occur very quickly if the liquid is to be dispersed into droplets prior to reaching the flame. For this to occur, very high atomizing gas velocities are required. While these high gas velocities can disperse the liquid into small droplets, they do so by creating turbulence, which in turn adversely affects the soot deposition rate.

Additionally, external atomizers rely on a very small atomizing gas annulus positioned around the liquid exit 
orifice to provide the high velocity atomization gas that impinges on the liquid. As a result, the close proximity of the liquid exit orifice and the soot reaction zone render both the liquid exit orifice and the atomizing gas annulus of the external atomizers susceptible to soot build up and clogging. When either the annulus or the liquid exit orifice is partially clogged by this soot build up, the flame, and thus the soot stream, becomes non-uniform and the soot deposition rate suffers. Because of the small size of these openings, cleaning of the external atomizer is both time consuming and difficult. Moreover, because the burners are shut down during cleaning operations, production down time has a significant adverse economic impact on operations.

The external atomizer is also expensive to manufacture and limited in flexibility. Since the liquid exit orifice on the burner face of the external atomizer is generally provided with a knife-edge to facilitate rapid mixing of the atomizing gases and the liquid stream discharged from the orifice, the liquid exit orifice diameter is limited to a dimension which is greater in size than preferred. Additionally, the liquid exit orifice must be centrally positioned within the annulus to avoid the problem of non-concentricity. Any slight misalignment, and the flame will be non-concentric. Non-concentricity results in poor soot deposition and is a serious problem during laydown. Accordingly, tolerances must be tight, which in turn increases manufacturing costs.

There is a need therefore for alternative methods and apparatus for depositing glass precursor soot, especially for optical fiber and other waveguide related applications.

SUMMARY OF THE INVENTION

The present invention is directed to an improved method and apparatus for delivering a liquid precursor to a burner flame to form soot used in the manufacture of glass. The liquid precursor, capable of being converted by thermal oxidative decomposition to glass, is provided and introduced directly into the flame of a combustion burner, thereby forming finely divided amorphous soot. The amorphous soot is typically deposited on a receptor surface where, either substantially simultaneously with or subsequent to its deposition, the soot is consolidated into a body of fused glass. The body of glass may then be either used to make products directly from the fused body, or the fused body may be further treated, e.g., by forming an optical waveguide such as by drawing to make optical waveguide fiber as further described in U.S. patent application Ser. No. 08/574, 961 entitled, "Method for Purifying Polyalkylsiloxanes and the Resulting Products", the specification of which is hereby incorporated by reference.

The burner assembly for delivering the precursor directly to the burner flame as an atomized liquid includes a novel recessed injector orifice that delivers a precision stream of liquid into a chamber where the stream is exposed to a low velocity atomizing gas. The introduction of the gas and liquid stream into the chamber increases the pressure within the chamber causing the liquid stream to be discharged as an aerosol from an exit orifice at the burner face of the atomizing burner assembly, which.

DETAILED DESCRIPTION OF THE INVENTION

Figure 1:
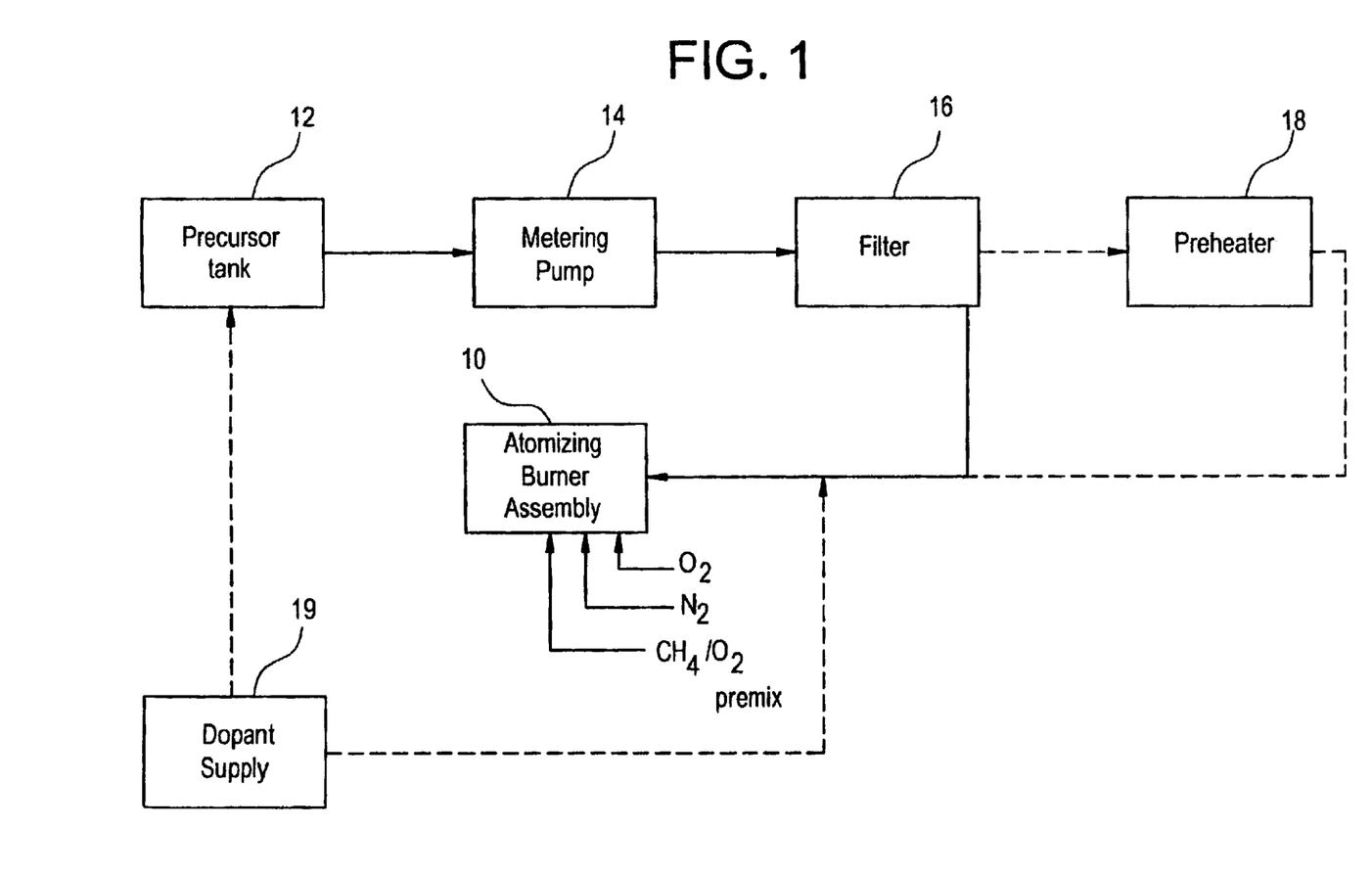
Figure 2:
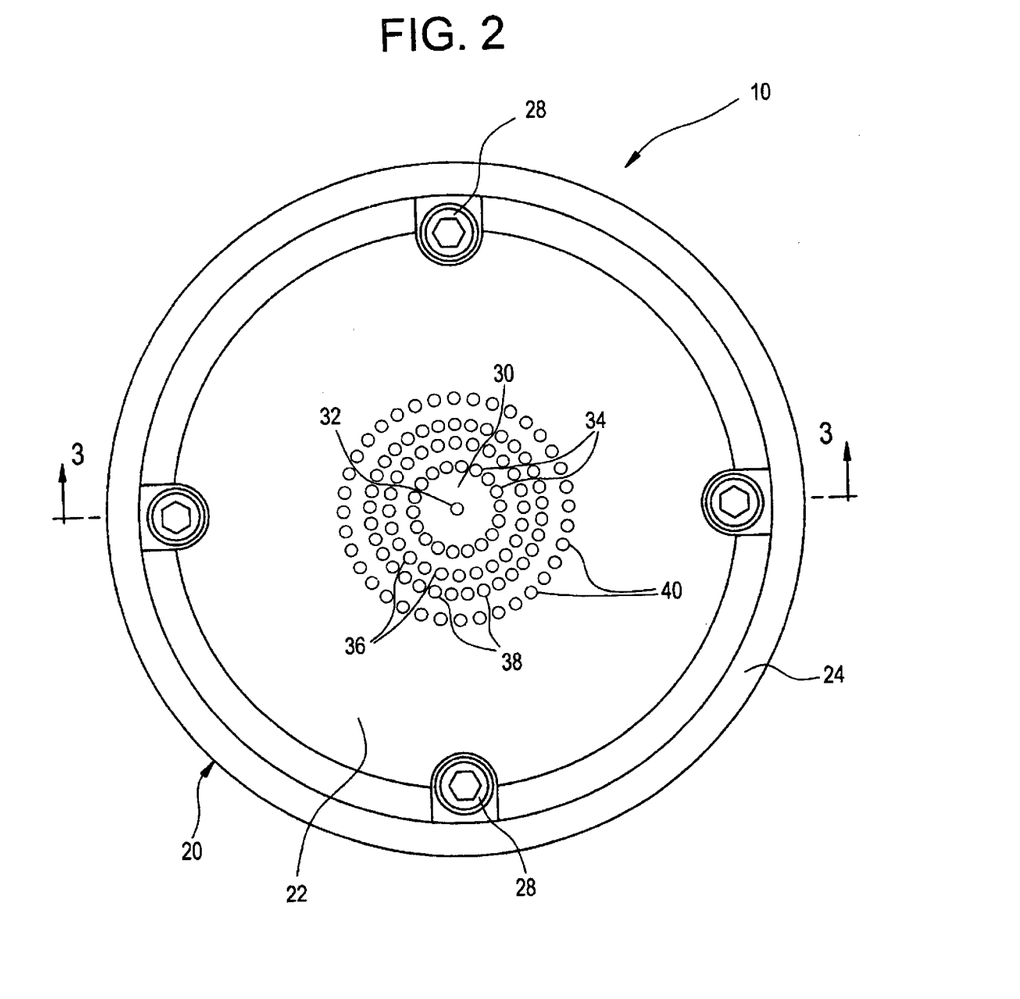

Reference will now be made in detail to the present preferred embodiment of the invention, an example of which is illustrated in the accompanying drawings, in which like reference characters indicate like parts throughout the several views. The atomizing burner assembly and method for forming soot for use in the manufacture of optical waveguides of the present invention forms a portion of a broader system as shown in FIG. 1. FIG. 1 schematically depicts an exemplary system for delivering a liquid precursor to atomizing burner assembly 10 of the present invention. It will be understood by those skilled in the optical fiber art that there are other systems and variations of the depicted system in which the present invention can be incorporated to perform the functions described and claimed herein.

In accordance with one aspect of the present invention, a liquid siloxane precursor such as, for example, a polymethylcyclosiloxane is stored in precursor tank 12. Precursor tank 12 is in fluid communication with atomizing burner assembly 10 via a liquid precursor transporting conduit system that can, if desired, include metering pump 14, filter 16, and optional preheater 18. The siloxane liquid precursor from tank 12 is transferred through the liquid precursor-transporting conduit by pump 14 through filter 16 to optional preheater 18. The liquid delivered through filter 16 is under sufficient pressure to substantially prevent and inhibit its volatilization in preheater 18, which is optionally employed to warm the liquid reactant prior to its introduction into atomizing burner assembly 10, and avoids the high temperatures of a vaporizer which typically promotes gel formation. Burner assembly 10 preferably is provided with an inner shield gas, a reaction gas, and a mixture of methane and oxygen for the flame, as described, for example, in U.S. Pat. No. 4,165,223 to D. R. Powers, the specification of which is hereby incorporated by reference. It is to be understood, however, that other gases, such as hydrogen in addition to, or other than methane and oxygen can be and often are used to support the burner flame.

The liquid precursor is conveyed from filter 16 or optional preheater 18 to the atomizing burner assembly 10, which as the name implies, atomizes the liquid precursor, provides the combustion source, and delivers the atomized liquid as an aerosol into the combustion source, which in the preferred embodiment, is a flame. Throughout the specification the precursor is described as being a "liquid" or as being in "liquid form". What is meant by these terms is that the precursor is in a substantially liquid state. Some small portion of the reactant may be in vapor form, particularly where preheater 14 is employed in the system, or where a nitrogen blanket over the liquid is employed. A small portion of the reactant can be in vapor form as delivered to the combustion site or soot reaction zone without adversely affecting the operation of the invention. Likewise, the precursor can contain small amounts of solids provided the solids are small enough to be burned upon entering the flame produced by atomizing burner assembly 10. The details of the present invention are described below.

Several types of atomizing injectors and nozzles capable of forming small droplets of liquid are known in the atomization art as disclosed in *Atomization and Sprays*, by Arthur H. Lefebure, Hemisphere Publishing Co., 1989, which is incorporated herein by reference. Atomizers can be operated by various energy sources and may be categorized as, for example, internal, external, air-blast, air-assist, jet, swirl, jet-swirl, pneumatic, rotary, acoustic, ultrasonic, electrostatic, and combinations of the same. Various types of these and other atomizers are further discussed in *Liquid Atomization*, by L. Bayvel and Z. Orzechowski, Taylor & Francis, (1993), which also is hereby incorporated by reference. The preferred atomizing burner assembly of the present invention incorporates an internal air-blast atomizer in its design.

Figure 3:
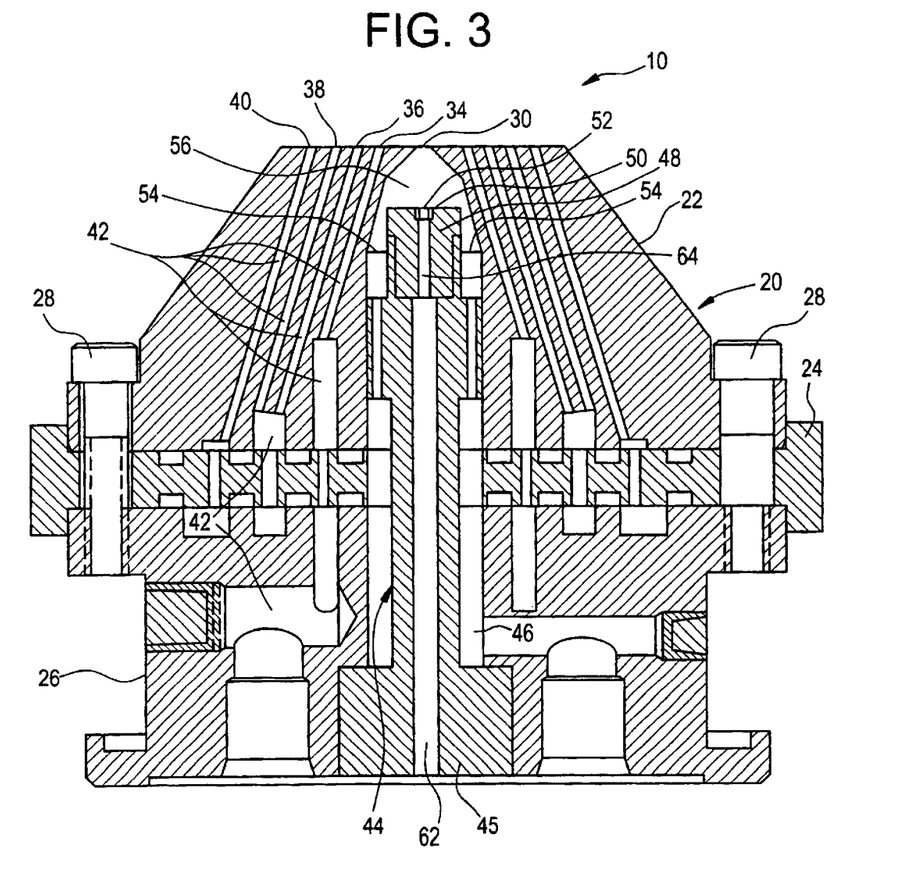

The preferred embodiment of the atomizing burner assembly of the present invention is shown in FIGS. 2 through 8 and is designated generally by reference numeral 10. As seen in the top view depicted in FIG. 2, atomizing burner assembly 10 includes a housing 20 formed from a cover 22, a sealing plate 24, and a base 26 (FIG. 3). The cover 22 is mounted to the base 26 with fasteners 28 such as hex nuts, such that the sealing plate 24 is interposed therebetween. As shown, the cover 22 is frustoconical in shape and has a centrally positioned burner face 30. A plurality of concentric rows of gas orifices are positioned on burner face 30 such that their common center corresponds to the location of atomization orifice 32. Inner shield gas orifices 34 form the row closest atomization orifice 32, followed next by a pair of rows of reaction gas orifices 36 and finally by a row of flame gas orifices 40. It will be understood by those skilled in the art that greater or fewer rows of gas orifices can be used with and will enable the present invention.

Figure 4:
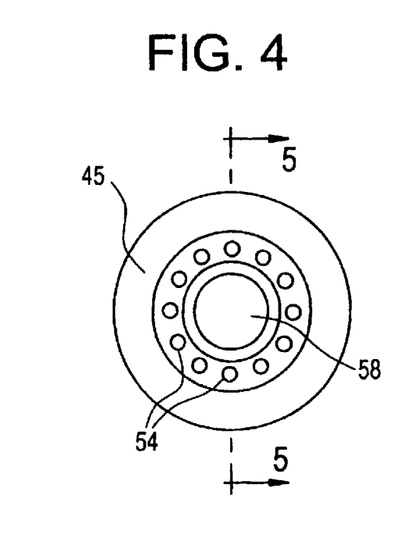
FIG. 4 is a top plan view of a preferred embodiment of the liquid tube of the present invention.
Figure 5:
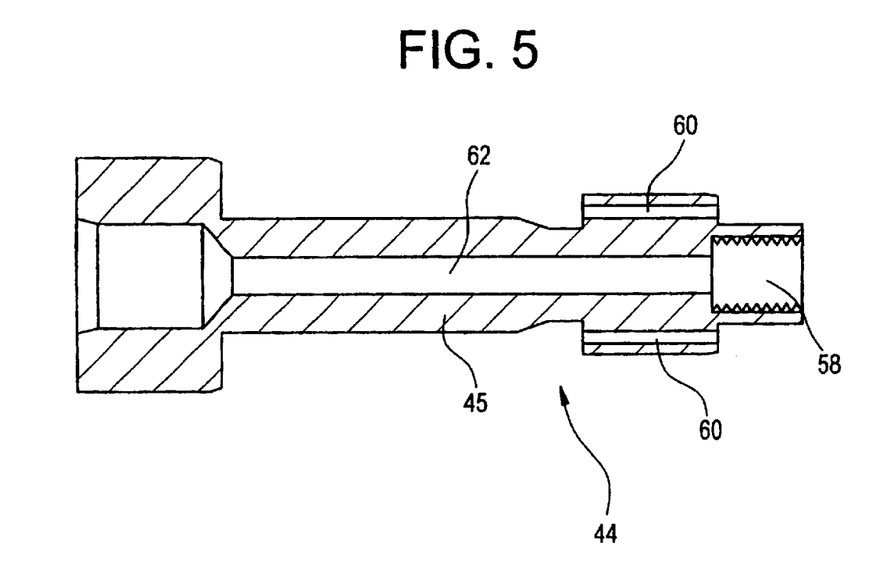
FIG. 5 is a side cross-sectional view of the liquid tube of the present invention taken along line 5—5 of FIG. 4.
Figure 6:
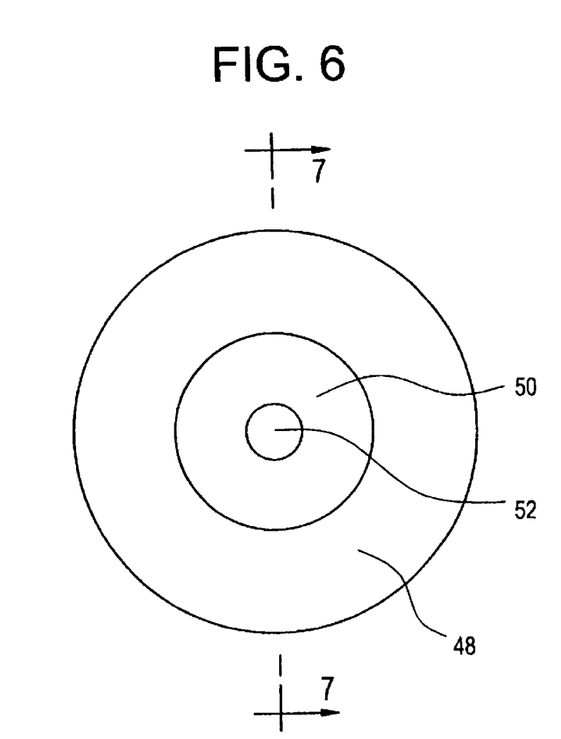
FIG. 6 is a top plan view of a preferred embodiment of the liquid orifice insert of the present invention.
Figure 7:
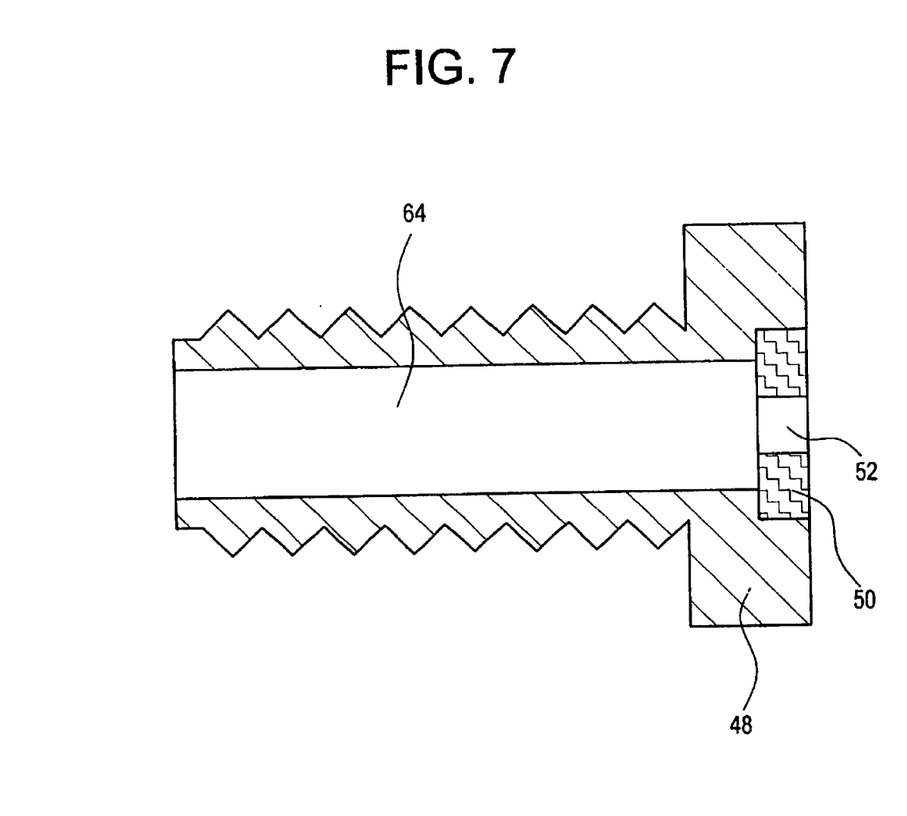
FIG. 7 is a side cross sectional view of the liquid orifice insert of the present invention taken along line 7—7 of FIG. 6.
Figure 8:
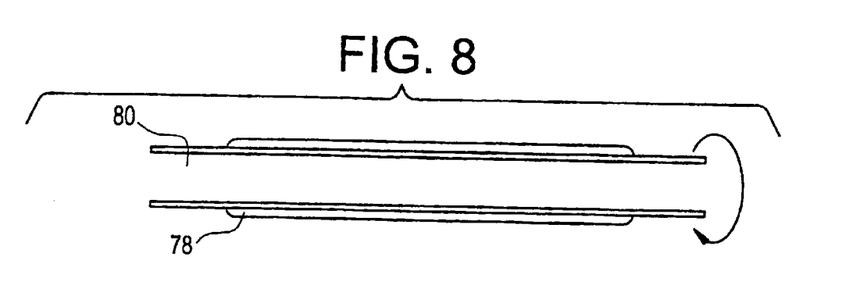
FIG. 8 is a schematic representation of liquid precursor droplets being discharged into a flame from the exit orifice of the preferred embodiment of the atomizing burner assembly of the present invention.

As shown in the cross-sectional view of FIG. 3, the gas orifices 34, 36, 38, and 40 communicate with gas supply lines (not shown) via a network of gas passageways 42, some of which cannot be seen in the present view. An injector 44 also forms a part of the preferred embodiment of the atomizing burner assembly 10. Injector 44 is centrally positioned within injector chamber 46 formed in housing 20 of atomizing burner assembly 10, and when seated within burner assembly 10, injector 44 and housing 20 define a pressurization chamber 56 therein. As shown clearly in FIGS. 4 through 7, injector 44 includes an elongated liquid tube 45 having a threaded bore 58 (FIGS. 4 and 5) adapted to removably receive a liquid orifice insert 48 (FIGS. 6 and 7). As illustrated in FIG. 4, circumferential row of atomization gas orifices 54 is positioned around the circumference of and on the head of injector 44 and surrounds threaded bore 58. Atomization gas passageways 60 place atomization gas orifices 54 in fluid communication with injector chamber 46 which is fed atomization gas 70 from gas passageway network 42. As illustrated in FIG. 8, atomization gas 70 is delivered from gas passageways 60, through atomization gas orifices 54, to pressurization chamber 56 where atomization gas 70 mixes with a stream of liquid discharged from injector 44, as will be described in greater detail below.

FIGS. 6 and 7 show the detail of liquid orifice insert 48. Liquid orifice insert 48 is preferably threaded for mating with threaded bore 58 in the head of liquid tube 45, and is fitted with injector orifice insert 50 having a precision injector orifice 52. Because it is removable, insert 50 can easily be changed in the event it becomes partially plugged with soot, or if a different injector orifice size is required or desired for other applications. Injector orifice insert 50 is preferably made from a material that can be cut to exacting specifications. In the preferred embodiment of the invention, it has been found that a jewel such as a ruby ($Al_2O_3$) meets this requirement. Typically, injector orifice insert 50 is cut to provide an injector orifice 52 having a diameter of between about 0.001 inches and 0.010 inches. Preferably, injector orifice 52 has a diameter of less than or equal to 0.006 inches. Injector orifice insert Model No. RB-22012, manufactured by Bird Precision of Waltham, Massachusetts, meets these requirements, but other injector orifice inserts 50 from other manufacturers can be used. As shown in FIGS. 3 and 5, liquid tube 45 has a centrally positioned injector passageway 62 which communicates with insert channel 64 when liquid orifice insert 48 is positioned within threaded bore 58. In this way, liquid precursor 66 from tank 12 can pass to and through precision injector orifice 52.

In operation, as shown in FIG. 8, liquid precursor 66 is delivered through liquid tube 45, liquid orifice insert 48, subsequently through injector orifice 52, and then into pressurization chamber 56 as a fine stream of liquid 68. At the same time, atomization gas 70 is delivered through atomization gas passageways 60 into pressurization chamber 56. Due in large part to the torroidal shape of chamber 56 and the reduced size of atomization orifice 32 as compared to the volume of chamber 56, liquid stream 68 is accelerated through pressurization chamber 56 and is discharged from atomization orifice 32 as an aerosol. When atomization occurs, liquid stream 68 is ripped into numerous droplets 76 of extremely small size and is directly delivered as an aerosol to flame 72 created adjacent burner face 30 by the combustion of reaction gas 84 delivered through reaction gas orifices 36 and 38, and flame gas 74 delivered through flame gas orifices 40. Where flame 72 and the aerosol meet and react is known as the soot reaction zone. Thermal oxidative decomposition of the aerosol in the soot reaction zone produces finely divided amorphous soot 78, which is deposited on rotatable mandrel 80.

Droplets 76 are combusted in the soot reaction zone above burner face 30 by flame 72 fueled by, preferably, a combination of methane and oxygen. The methane and oxygen form the flame gas 74, which is preferably conducted through flame gas orifices 40 to the soot reaction zone. A reaction gas 84 such as oxygen is delivered to the soot reaction zone through reaction gas orifices 36 and 38 to provide an oxygen rich environment for the flame 72, and thus provide for better combustion. A shield gas 82, such as nitrogen, argon, helium or another inert gas, but preferably nitrogen, is delivered through shield gas orifices 34 to inhibit the premature reaction of droplets 76 with flame 72, and thus prevent soot build-up on burner face 30. Atomization gas 70 may consist of nitrogen, or other inert gases, or mixtures thereof. It is also possible for the atomizing gas 70 to be a mixture of elements such as nitrogen and oxygen; however, it has been found that the most preferable gas is oxygen alone, as it reduces the formation of defects in the soot blank. One advantage of the preferred embodiment thus configured and operated is that atomizing burner assembly 10 of the present invention produces a narrower soot stream than external atomizing burner assemblies presently known in the art.

To reduce the velocity of atomizing gas 70 and prevent surface defects on the soot blank, oxygen is the most preferred atomizing gas to be used in atomizing burner assembly 10. Using oxygen as the atomizing gas allows for better mixing of liquid precursor 66 with the oxygen before conversion to soot. Use of this atomizing gas results in quicker heating of the liquid and helps provide the oxygen needed for the reaction. Therefore, the velocity of the oxygen atomizing gas can be significantly lowered, at least by about 50%, compared to the velocity of the atomizing gas when pure nitrogen is employed. This reduction in gas velocity consequently reduces burner flame turbulence and thus soot blank defects. The construction and arrangement of pressurization chamber 56 further reduces the velocity requirements of atomization gas 70, and thus, flame turbulence is reduced even further.

Figure 9:
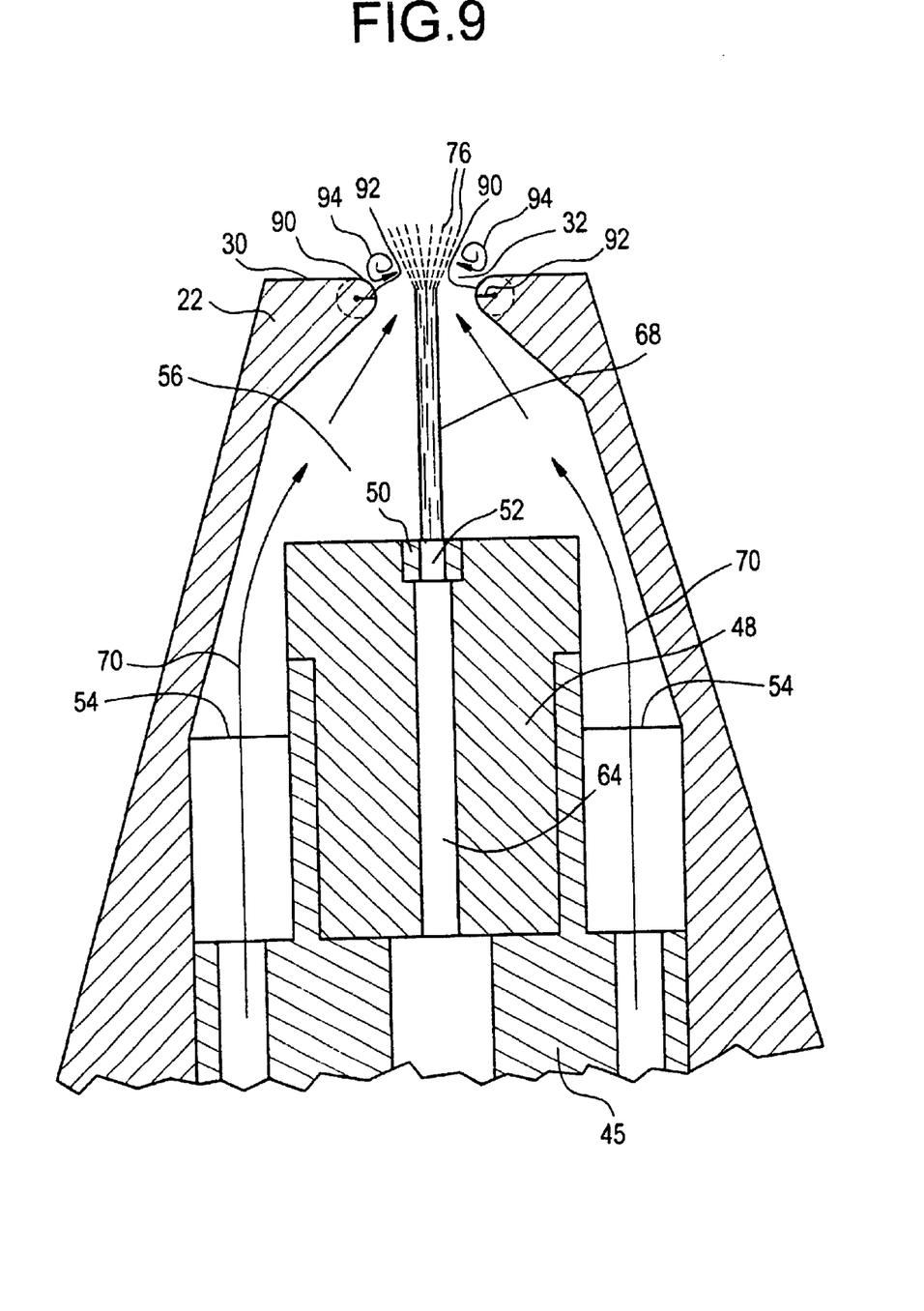
FIG. 9 is a partial cross-sectional view of a low turbulence embodiment of the burner assembly of the present invention illustrating the rounded orifice rim.

FIG. 9 illustrates a preferred atomizing burner assembly 10 design for reducing flame turbulence associated with the delivery of liquid precursors into a flame. This embodiment of the present invention differs from the embodiment shown in FIG. 8 in that the portion of cover 22 housing liquid orifice insert 48 has a rounded or curved orifice rim 90 bounding and defining atomization orifice 32. Rounded orifice rim 90 reduces flame turbulence 94 produced adjacent burner face 30 and atomization orifice 32, which in turn facilitates better atomization, and reduces soot build up (not shown) on burner face 30. Accordingly, clogging of atomization orifice 32 and thus the need for frequent burner face cleaning are reduced. Thus, elements such as potassium and calcium present in certain optical waveguide precursors no longer solidify and deposit on the surface of burner face 30 around atomization orifice 32 as has been found with burner assembly's having a knife-edge rim, such as that shown in FIG. 8.

As discussed above, orifice rim 90 is preferably a non-linear surface and is more preferably a rounded surface. During tooling, orifice rim 90 is preferably shaped to have a radius 92, which is between about ¼ to ⅔ of the diameter of atomization orifice 32. More preferably, radius 92 is about ½ of the diameter of atomization orifice 32. Accordingly, if the atomization orifice 32 diameter is approximately 0.03 inches, the radius 92 of orifice rim 90 defining atomization orifice 32 will preferably be approximately 0.015 inches. It will be understood, however, that rounded surfaces other than semi-circular rounded surfaces will also reduce flame turbulence 94, and thus, curved rounded orifice rims 90 having non-uniform radial dimensions are also intended to be a part of the invention of the burner assembly described herein.

The apparatus can also be provided with dopant supply tank 19, shown in FIG. 1, which contains a compound capable of being converted by oxidation or flame hydrolysis to $P_2O_5$ or to a metal oxide whose metallic component is selected from Groups IA, IB, IIA, IIB, IIIA, IIIB, IVA, IVB, VA, and the rare earth series of the Periodic Table. These oxide dopants combine with the soot generated by burner assembly 10 to provide doped soot, which can be subsequently formed into optical waveguide fibers. The dopant can be supplied to precursor tank 12 and mixed with the precursor in tank 12, or alternatively, the dopant can be delivered from supply tank 19 to atomizing burner assembly 10 via a separate metering pump and optionally a filter (not shown) analogous to the delivery system used for the precursor stored in precursor tank 12.

In accordance with the invention, the preferably halide-free, silicon-containing precursor preferably is a polyalkylsiloxane, for example, hexamethyldisiloxane. More preferably, the polyalkylsiloxane is a polymethylcyclosiloxane. Most preferably, the polymethylcyclosiloxane such as hexamethylcyclotrisiloxane, octamethylcyclotetrasiloxane, decamethylcyclopentasiloxane, dodecamethylcyclohexasiloxane, and mixtures thereof.

It will be apparent to those skilled in the art that various modifications and variations can be made in the method and apparatus for forming soot for use in manufacturing optical waveguides of the present invention without departing from the spirit or scope of the invention. Thus, it is intended that the present invention covers the modification and variations of this invention provided they come within the scope of the appended claims and their equivalents. In addition, the corresponding structures, materials, acts and equivalents of all means or step plus function elements in the claims below are intended to include any structure, material, or acts for performing the functions in combination with other claimed elements as specifically claimed herein.

What is claimed is:

1. A method of forming soot for use in making glass said method comprising the steps of:
    a) delivering a liquid precursor to an injector having an injector orifice recessed within a burner assembly said burner assembly having an atomization orifice;
    b) discharging said liquid precursor through the injector orifice into a chamber as a liquid stream said chamber being defined by said burner assembly and said injector;
    c) introducing a gas into said chamber to increase the pressure therein;
    d) discharging said liquid precursor from the atomization orifice as an aerosol; and
    e) reacting said aerosol in a flame produced by said burner assembly.

2. The method of claim 1 further comprising the step of fitting said injector with a removable liquid orifice insert defining a precision orifice having a diameter less than 0.011 inches.

3. The method of claim 1 wherein sate c) comprises introducing an inert gas into said chamber.

4. The method of claim 3 wherein step c) further comprises introducing nitrogen into said chamber.

5. The method of claim 1 wherein step c) further comprises introducing oxygen into said chamber.

6. The method of claim 1 wherein said gas consists essentially of oxygen and nitrogen.

7. The method of claim 1 wherein said liquid precursor comprises a metal.

8. The method of claim 1 wherein said liquid precursor comprises a siloxane.

9. The method of claim 8 wherein said siloxane is octamethylcyclotetrasiloxane.

10. The method of claim 7 wherein said metal comprises a metal selected form the Grotups IA, IB, IIA, IIB, IIIA, IIIB, IVA, IVB, VA, and the rare earth series of the Periodic Table of Elements.

11. A burner assembly for delivering a liquid precursor into a flame as an aerosol to form soot for making optical waveguides, said burner assembly comprising:
    a housing having a burner face defining a plurality of gas orifices and an atomization orifice, said housing defining an injector chamber and a plurality of gas passageways, the gas passageways being in fluid communication with the gas orifices and the injector chamber; and
    an injector having a first end defining an injector orifice in fluid communication with the liquid precursor and constructed to deliver the liquid precursor as a liquid stream, said injector being positioned within the injector chamber aid, together with said housing, defining a pressurization chamber wherein the injector orifice is remote from the atomization orifice.

12. The burner assembly of claim 1 wherein said injector comprises a liquid tube and a liquid orifice insert.

13. The burner assembly of claim 12 wherein said liquid orifice insert is releasably engaged with said liquid tube.

14. The burner assembly of claim 12 wherein said liquid tube included a plurality of atomization gas orifices circumferentially spaced around said liquid orifice insert.

15. The burner assembly of claim 2 wherein said liquid orifice insert comprises a material defining a precision orifice.

16. The burner assembly of claim 15 wherein said material comprises a jewel.

17. The burner assembly of claim 11 wherein the injector chamber is frustoconical and said atomization orifice is larger than said injector orifice.

18. The burner assembly of claim 11 wherein the portion of the burner face defining the atomization orifice is shaped to reduce turbulence.

19. A burner assembly for the liquid delivery of optical waveguide precursors, said burner assembly comprising:
    an injector constructed and arranged to deliver the liquid precursor as a liquid stream; and a housing substantially surrounding said injector, said housing having a burner face including an orifice rim defining an atomization orifice, the orifice rim being shaped such that turbulence is reduced as the liquid precursor is discharged from the atomization orifice.

20. The burner assembly of claim 19 wherein the orifice rim is rounded.

21. The burner assembly of claim 20 wherein the rounded orifice rim has a radius of between about ¼ and ⅔ of the atomization orifice diameter.

* * * * *

UNITED STATES PATENT AND TRADEMARK OFFICE
CERTIFICATE OF CORRECTION

PATENT NO.    : 6,672,106 B1
DATED         : January 6, 2004
INVENTOR(S)   : Daniel Warren Hawtof et al.

It is certified that error appears in the above-identified patent and that said Letters Patent is hereby corrected as shown below:

Column 10,
Line 24, it currently reads: "tube included a plurality of atomization" it should read:
-- tube includes a plurality of atomization --

Signed and Sealed this

Seventeenth Day of May, 2005

JON W. DUDAS
*Director of the United States Patent and Trademark Office*